United States Patent
Kawane et al.

(10) Patent No.: US 9,785,034 B2
(45) Date of Patent: Oct. 10, 2017

(54) IMAGING APPARATUS AND LENS BARREL

(71) Applicant: Panasonic Intellectual Property Management Co., Ltd., Osaka (JP)

(72) Inventors: Hideaki Kawane, Osaka (JP); Yoshihiro Ohtani, Osaka (JP); Atsushi Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 6 days.

(21) Appl. No.: 15/058,799

(22) Filed: Mar. 2, 2016

(65) Prior Publication Data

US 2016/0269616 A1 Sep. 15, 2016

(30) Foreign Application Priority Data

Mar. 9, 2015 (JP) ................................. 2015-046511
Jan. 25, 2016 (JP) ................................. 2016-011499

(51) Int. Cl.
| | | |
|---|---|---|
| *G02B 9/00* | (2006.01) | |
| *G02B 9/08* | (2006.01) | |
| *G03B 3/10* | (2006.01) | |
| *G02B 7/10* | (2006.01) | |

(52) U.S. Cl.
CPC ............... *G03B 3/10* (2013.01); *G02B 7/102* (2013.01); *G03B 2205/0069* (2013.01)

(58) Field of Classification Search
CPC . G02B 7/102; G02B 7/04; G02B 7/10; G02B 7/021; G02B 7/023; G02B 7/09; G02B 7/003; G02B 7/005; G02B 7/02; G02B 7/282; G02B 7/105; G02B 27/646; G02B 15/14; G02B 13/001; G02B 13/009
USPC ................ 359/694–706, 822–826, 738–740
See application file for complete search history.

(56) References Cited

U.S. PATENT DOCUMENTS

2009/0284845 A1* 11/2009 Sugiura .................. G02B 7/102
359/697

FOREIGN PATENT DOCUMENTS

JP 06-105210 4/1994

* cited by examiner

*Primary Examiner* — Mahidere Sahle
(74) *Attorney, Agent, or Firm* — Wenderoth, Lind & Ponack, L.L.P.

(57) ABSTRACT

An imaging apparatus moves a lens in the optical axis direction with respect to the initialization position, and images a subject. The imaging apparatus includes a first lens, a second lens, a driving unit, a first position detection sensor, a second position detection sensor, a third position detection sensor, and a control unit. The driving unit moves the first lens and second lens in the optical axis direction. The first position detection sensor detects the position of the first lens. The second position detection sensor detects the position of the second lens. The third position detection sensor detects the position of the first lens and the position of the second lens. On the basis of the output from the third position detection sensor, the control unit executes the initializing processing of determining the initialization positions of the first lens and second lens.

8 Claims, 11 Drawing Sheets

IMAGING APPARATUS AND LENS BARREL

BACKGROUND

1. Technical Field

The present disclosure relates to a lens barrel and imaging apparatus including a plurality of lenses arranged along the optical axis direction, and more specifically to a lens barrel and imaging apparatus for executing position detection of each lens.

2. Description of Related Art

An imaging apparatus must manage the positions of a plurality of lens groups that move in the optical axis direction for focusing or zooming. In the case of managing the positional relationship between the plurality of lens groups, the reference position (origin) of each lens group is detected using a plurality of position sensors. Such a conventional imaging apparatus is disclosed in Unexamined Japanese Patent Publication No. H06-105210, for example.

SUMMARY

The present disclosure provides an imaging apparatus and lens barrel effective at performing an accurate position management of a plurality of lenses.

The imaging apparatus of the present disclosure moves a lens in the optical axis direction with respect to the initialization position, and images a subject. The imaging apparatus includes a first lens, a second lens, a driving unit, a first position detection sensor, a second position detection sensor, a third position detection sensor, and a control unit. The driving unit moves the first lens and second lens in the optical axis direction. The first position detection sensor detects the position of the first lens. The second position detection sensor detects the position of the second lens. The third position detection sensor detects the position of the first lens and the position of the second lens. The control unit controls the driving unit, and processes the outputs from the first position detection sensor, second position detection sensor, and third position detection sensor. Specifically, on the basis of the output from the third position detection sensor, the control unit executes the initializing processing of determining the initialization positions of the first lens and second lens.

DETAILED DESCRIPTION

Hereinafter, exemplary embodiments will be described in detail appropriately with reference to the accompanying drawings. Description more detailed than necessary is sometimes omitted. For example, a detailed description of a well-known item and a repeated description of substantially the same configuration are sometimes omitted. This is for the purpose of preventing the following descriptions from becoming more redundant than necessary and of allowing persons skilled in the art to easily understand the exemplary embodiments.

The applicant provides accompanying drawings and the following descriptions to allow the persons skilled in the art to sufficiently understand the present disclosure. It is not intended that they restrict the main subject described within the scope of the claims.

First Exemplary Embodiment

Figure 7:
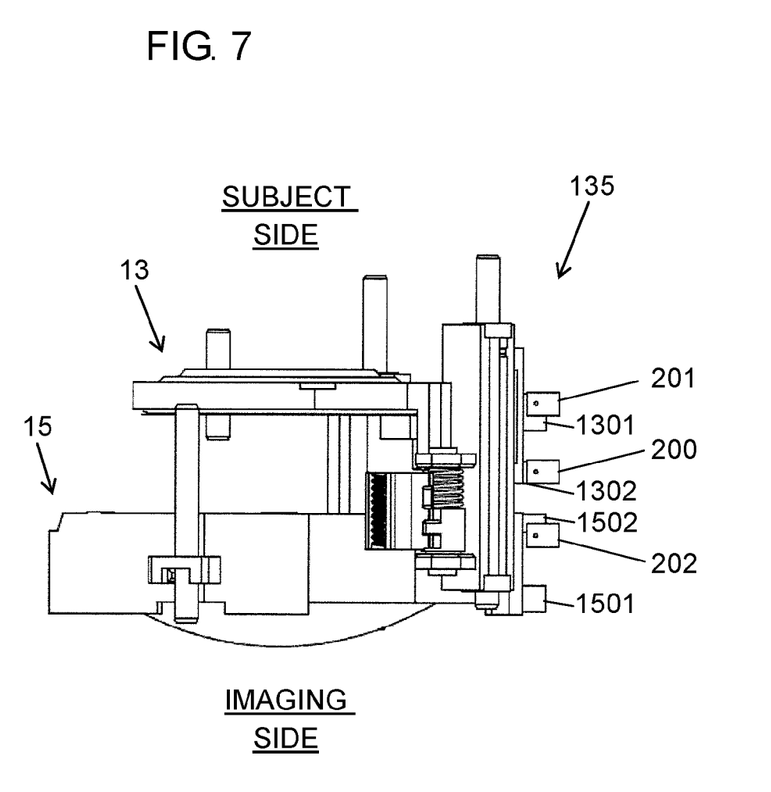
FIG. 7 is a side view showing the third-group/fifth-group lens frame unit of FIG. 6 in a partially omitted state.
Figure 8:
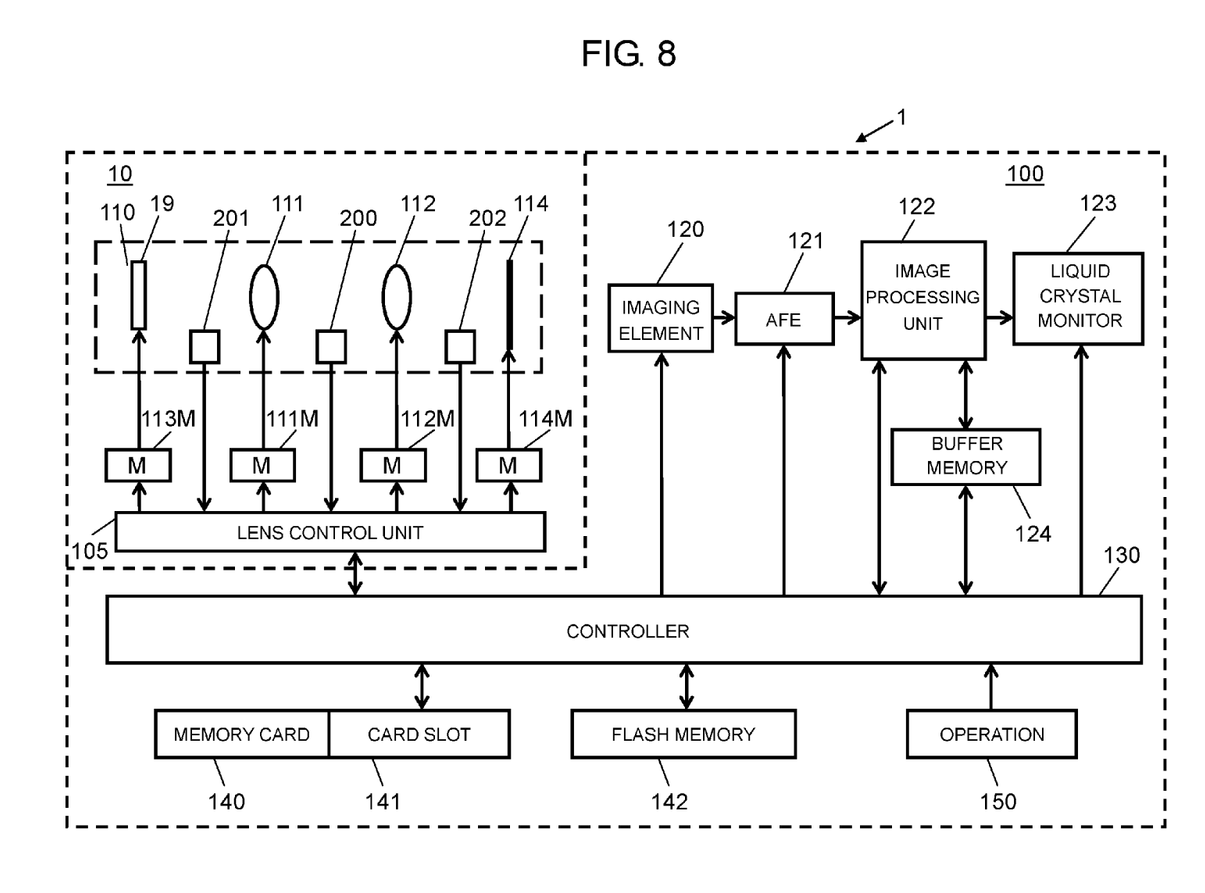
FIG. 8 is a control block diagram of an imaging apparatus including the lens barrel.

Imaging apparatus 1 of an exemplary embodiment of the present disclosure is hereinafter described with reference to FIG. 1 to FIG. 8. As shown in FIG. 8, imaging apparatus 1 includes camera body 100 and lens barrel 10 attached to camera body 100.

Lens barrel 10 is described using FIG. 1 to FIG. 8.

[1-1. Configuration of Whole Lens Barrel 10]

Figure 1:
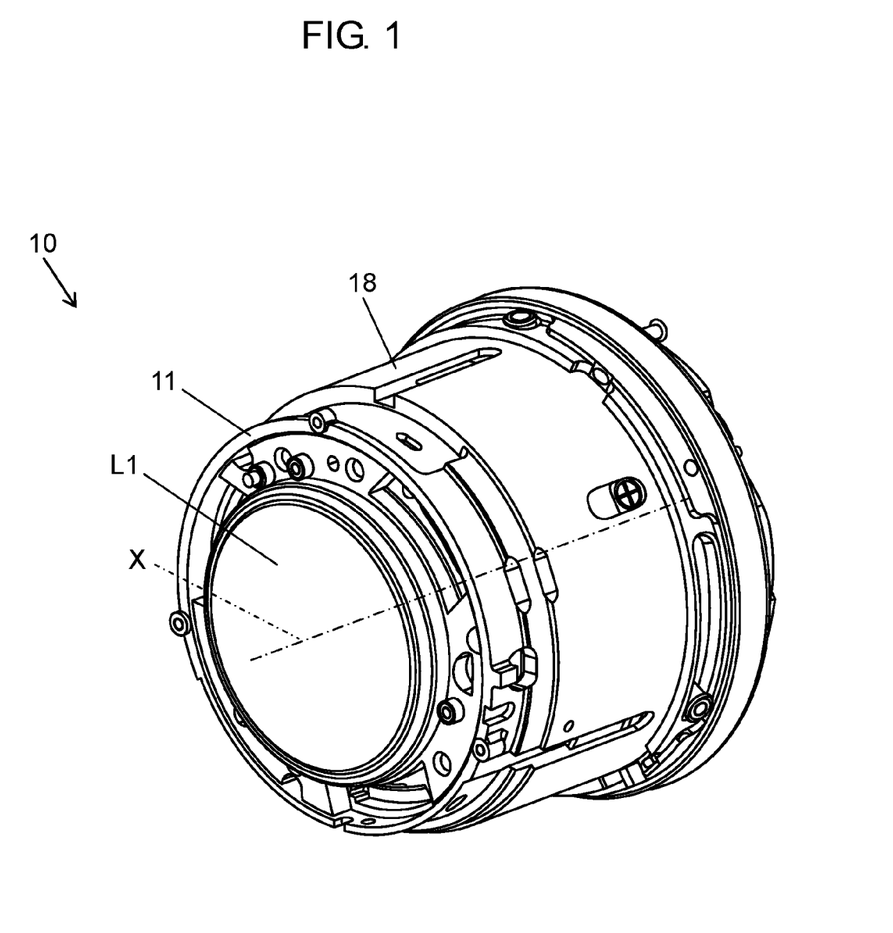
FIG. 1 is an overall perspective view showing the configuration of a lens barrel in accordance with an exemplary embodiment of the present disclosure.
Figure 2:
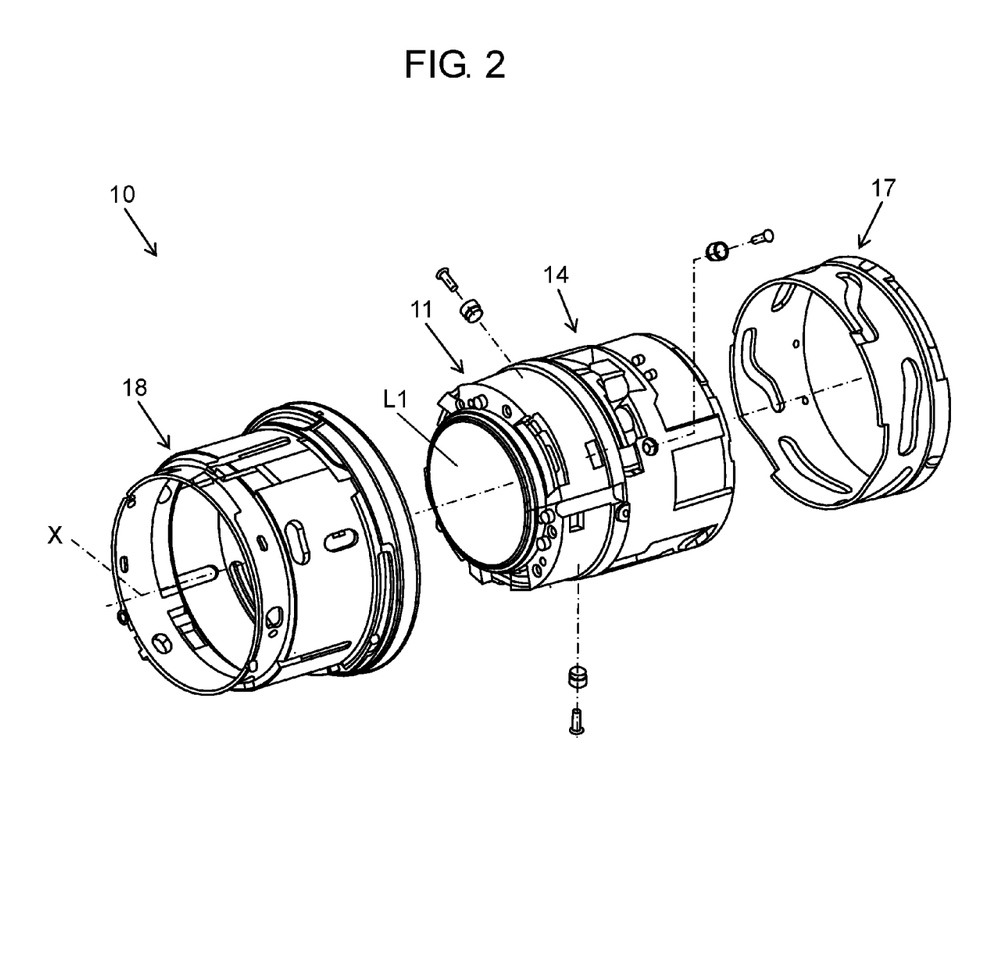
FIG. 2 is an exploded perspective view of the lens barrel of FIG. 1.
Figure 3:
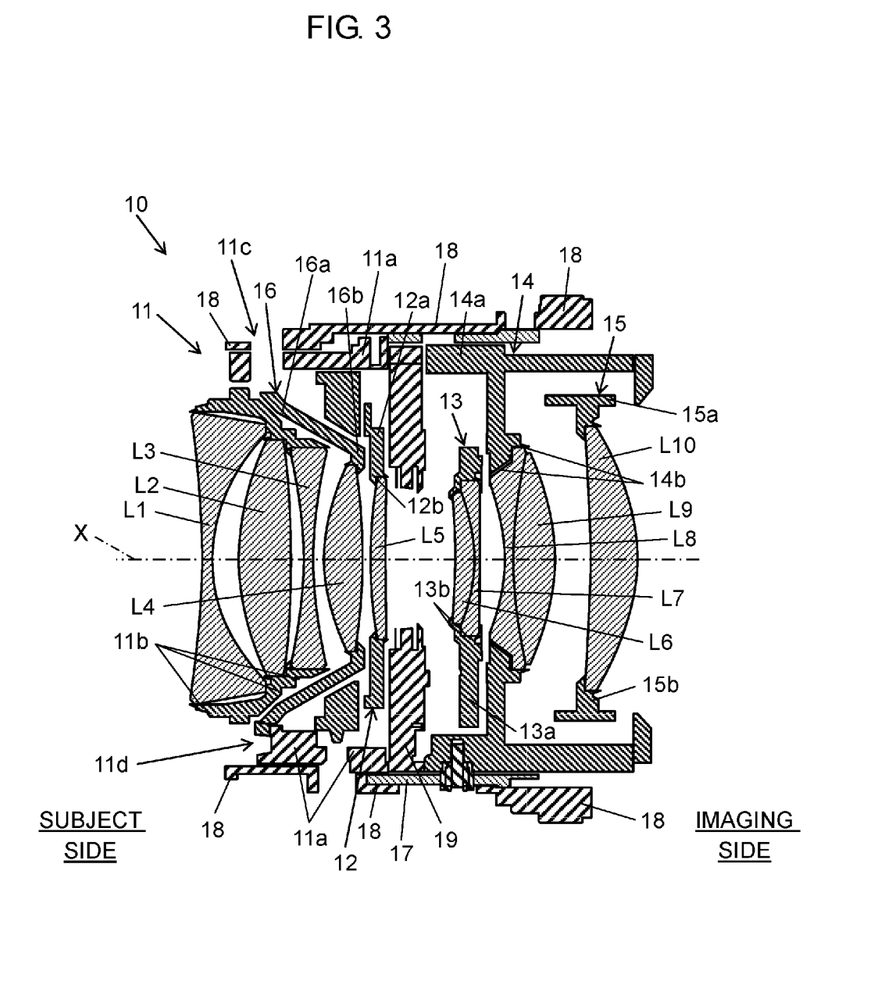
FIG. 3 is a sectional view showing the internal configuration of the lens barrel of FIG. 1.

As shown in FIG. 1, lens barrel 10 of the present exemplary embodiment is configured to be attachable to and detachable from camera body 100 (FIG. 8). As shown in FIG. 2 and FIG. 3, lens barrel 10 includes six lens frames (first-group lens frame unit 11 to fifth-group lens frame unit 15, and lens frame 16), cam frame 17, fixed frame 18, diaphragm unit 19, and shutter 114 (FIG. 8). The six lens frames (first-group lens frame unit 11 to fifth-group lens frame unit 15, and lens frame 16) hold an optical system including 10 lenses L1 to L10 along the optical axis X direction.

As shown in FIG. 3, 10 lenses L1 to L10 are arranged in this sequence from the subject side along the optical axis X direction, and guide an optical image of the subject to imaging element 120 described later (FIG. 8) mounted in camera body 100.

[1-1-1. First-Group Lens Frame Unit 11]

As shown in FIG. 3, first-group lens frame unit 11 is a lens frame disposed on the side closest to the subject, and includes three lenses L1 to L3. First-group lens frame unit 11 includes main body 11a, lens holding unit 11b, insertion hole 11c, and opening 11d.

[1-1-2. Second-Group Lens Frame Unit 12]

As shown in FIG. 3, second-group lens frame unit 12 is disposed on the inner peripheral side of main body 11a of first-group lens frame unit 11. First-group lens frame unit 11 and second-group lens frame unit 12 are disposed so that lens frame 16 is sandwiched between them. Second-group lens frame unit 12 includes main body 12a, lens holding unit 12b, and lens L5 as shown in FIG. 3.

Main body 12a is a substantially-disk-like member, and has lens holding unit 12b in its central opening.

Lens holding unit 12b is a substantially circular opening, and holds lens L5.

[1-1-3. Third-Group Lens Frame Unit 13]

As shown in FIG. 3, third-group lens frame unit 13 is disposed on the inner peripheral side of main body 14a of cylindrical fourth-group lens frame unit 14 so that third-group lens frame unit 13 can move in the optical axis X direction. Third-group lens frame unit 13 includes main body 13a, lens holding unit 13b, and lenses L6 and L7. Third-group lens frame unit 13 is moved back and forth in the optical axis X direction by being driven by motor 111M (one example of the driving unit) shown in FIG. 8 as described later.

Figure 4A:
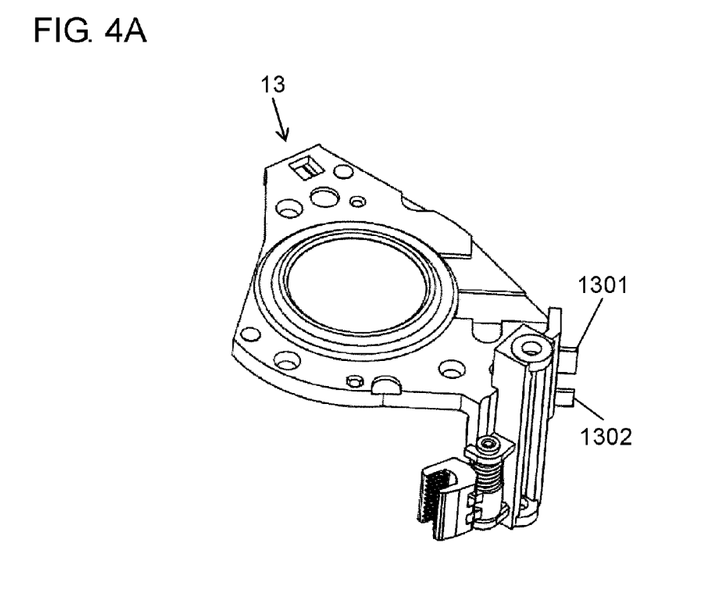
FIG. 4A is a perspective view of a third-group lens frame unit.
Figure 4B:
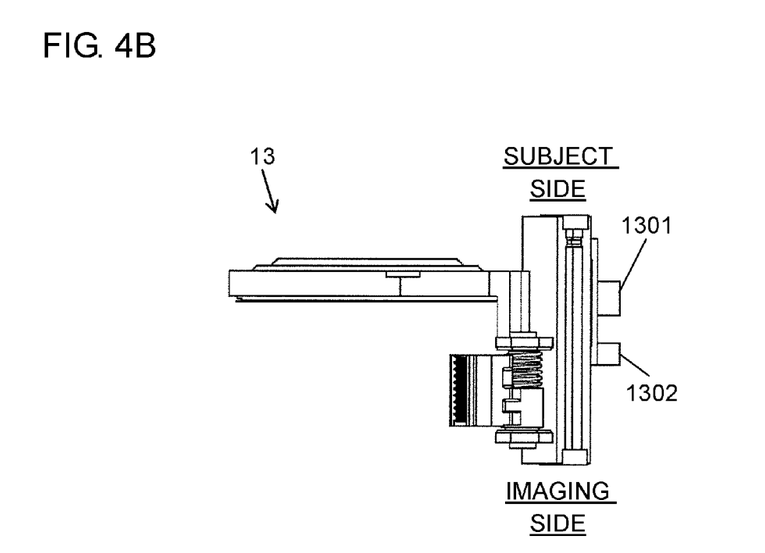
FIG. 4B is a diagram of the third-group lens frame unit viewed from a side surface.

As shown in FIG. 4A and FIG. 4B, third-group lens frame unit 13 includes light shielding unit 1301 (one example of a first light shielding unit) and light shielding unit 1302 (one example of a second light shielding unit) that are formed at a certain interval so as to project from the outer periphery of third-group lens frame unit 13. Light shielding unit 1301 is disposed on the subject side, and light shielding unit 1302 is disposed on the imaging side. Light shielding units 1301 and 1302 move as third-group lens frame unit 13 moves in the optical axis X direction, and control the light receiving and light shielding of photo interrupters (PIs) 201 and 200 described later, respectively. Third-group lens frame unit 13 is designed movably in the range between the limit positions (Near Limit and Far Limit) on the Near side and Far side.

As shown in FIG. 3, main body 13a is a substantially-disk-like member, and is disposed on the imaging side of diaphragm unit 19 when viewed from the subject side in the optical axis X direction. Main body 13a has lens holding unit 13b in its central opening.

Lens holding unit 13b is a substantially circular opening, and holds lenses L6 and L7.

Lenses L6 and L7 form third-group focus lens 111 (one example of the first lens) shown in FIG. 8 as described later.

[1-1-4. Fourth-Group Lens Frame Unit 14]

As shown in FIG. 3, fourth-group lens frame unit 14 has a substantially cylindrical shape, and is disposed on the imaging side of third-group lens frame unit 13 when viewed from the subject side in the optical axis X direction. Fourth-group lens frame unit 14 includes main body 14a, lens holding unit 14b, and lenses L8 and L9.

Main body 14a is a cylindrical member. Lens holding unit 14b for holding two lenses L8 and L9 is disposed on the inner peripheral side of cylindrical main body 14a. Main body 14a includes attachment units (not shown) for PIs 200, 201, and 202 described later. PIs 200, 201, and 202 are attached so as to project to the inside of main body 14a.

[1-1-5. Fifth-Group Lens Frame Unit 15]

As shown in FIG. 3, fifth-group lens frame unit 15 is disposed on the inner peripheral side of main body 14a of cylindrical fourth-group lens frame unit 14 so that fifth-group lens frame unit 15 can move in the optical axis X direction. Fifth-group lens frame unit 15 includes main body 15a, lens holding unit 15b, and lens L10. Fifth-group lens frame unit 15 is moved back and forth in the optical axis X direction by being driven by motor 112M (one example of the driving unit) shown in FIG. 8 as described later.

Figure 5A:
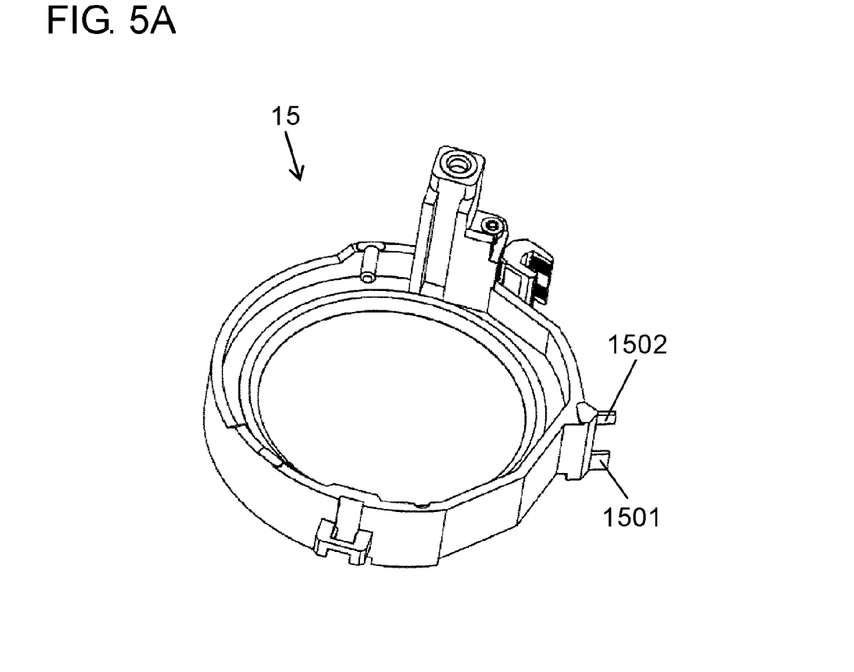
FIG. 5A is a perspective view of a fifth-group lens frame unit.
Figure 5B:
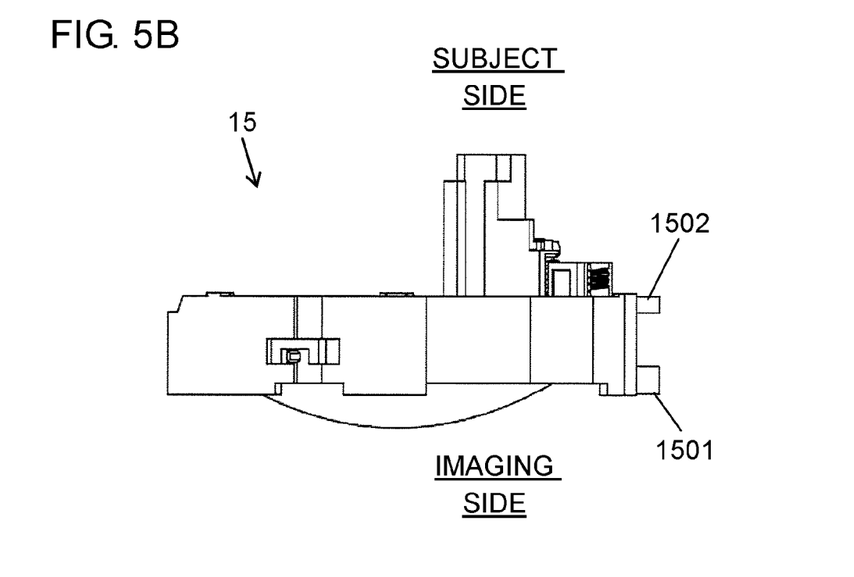
FIG. 5B is a diagram of the fifth-group lens frame unit viewed from a side.

As shown in FIG. 5A and FIG. 5B, fifth-group lens frame unit 15 includes light shielding unit 1501 (one example of a third light shielding unit) and light shielding unit 1502 (one example of a fourth light shielding unit) that are formed at a certain interval so as to project from the outer periphery of fifth-group lens frame unit 15. Light shielding unit 1502 is disposed on the subject side, and light shielding unit 1501 is disposed on the imaging side. Light shielding units 1501 and 1502 move as fifth-group lens frame unit 15 moves in the optical axis X direction, and control the light receiving and light shielding of photo interrupters (PIs) 202 and 200 described later, respectively. Fifth-group lens frame unit 15 is designed movably in the range between the limit positions (Near Limit and Far Limit) on the Near side and Far side.

As shown in FIG. 3, main body 15a is a substantially-disk-like member, and is disposed on the imaging side of lens L9 included in fourth-group lens frame unit 14 when viewed from the subject side in the optical axis X direction. Main body 15a has lens holding unit 15b in its central opening.

Lens holding unit 15b is a substantially circular opening, and holds lens L10.

Lens L10 forms fifth-group focus lens 112 (one example of the second lens) shown in FIG. 8 as described later.

[1-1-6. Lens Frame 16]

As shown in FIG. 3, lens frame 16 is disposed on the inner peripheral side of main body 11a of first-group lens frame unit 11 so that lens frame 16 is sandwiched between a lens group included in first-group lens frame unit 11 and second-group lens frame unit 12 in the optical axis X direction. Lens frame 16 includes main body 16a, lens holding unit 16b, and lens L4 as shown in FIG. 3.

As shown in FIG. 3, main body 16a is a substantially-conical-cylindrical member having a substantially trapezoidal shape in the cross sectional view, and has lens holding unit 16b in its central opening.

Lens holding unit 16b is a substantially circular opening, and holds lens L4. In the assembled state of lens barrel 10, as shown in FIG. 2 and FIG. 3, lens frame 16 is fixed to first-group lens frame unit 11 so that lens holding unit 16b is disposed on the imaging side in the optical axis X direction.

[1-1-7. Configuration of Third-Group/Fifth-Group Lens Frame Unit]

Hereinafter, the configuration (hereinafter referred to as "third-group/fifth-group lens frame unit 135") produced by assembling third-group lens frame unit 13 and fifth-group lens frame unit 15 is described with reference to FIG. 6 and FIG. 7. Third-group/fifth-group lens frame unit 135 is a unit for performing the position management of the lenses of the present exemplary embodiment.

Figure 6:
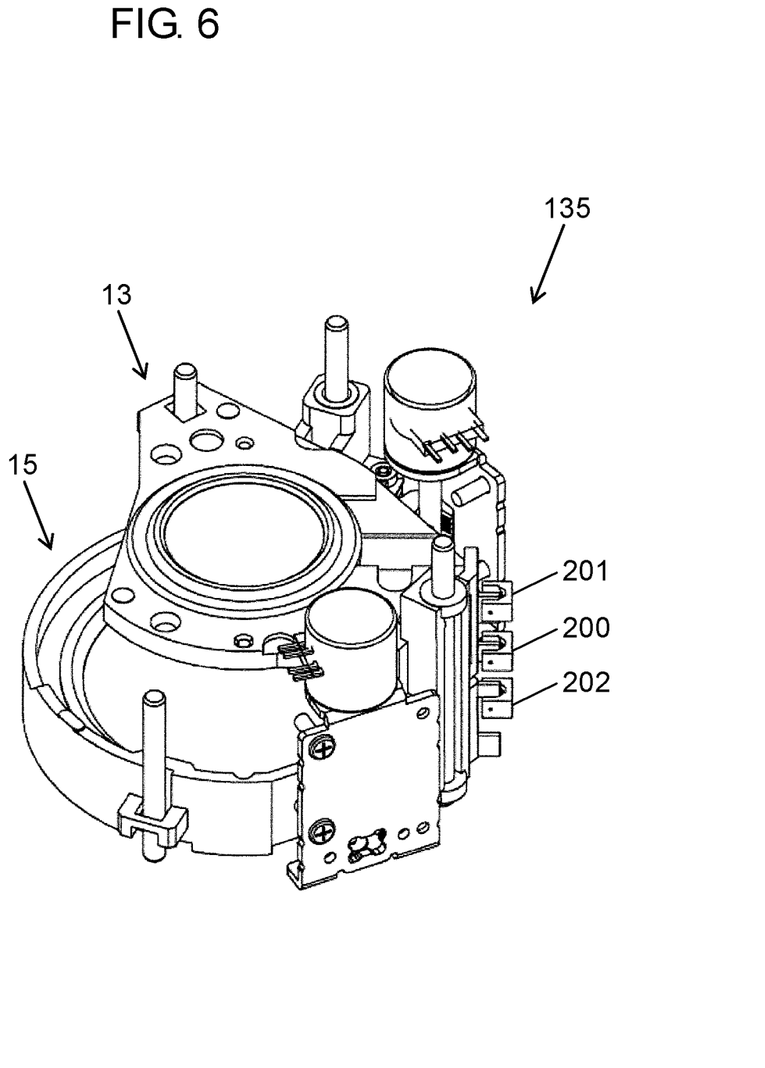
FIG. 6 is a perspective view of a third-group/fifth-group lens frame unit produced by assembling the third-group lens frame unit and fifth-group lens frame unit.

FIG. 6 shows third-group/fifth-group lens frame unit 135 including PI 201 (one example of the first position detection sensor), PI 200 (one example of the third position detection sensor), PI 202 (one example of the second position detection sensor) that are attached to fourth-group lens frame unit 14 (not shown here). As shown in FIG. 7, PIs 201, 200, and 202 are disposed so that they can face light shielding units 1301 and 1302 on third-group lens frame unit 13 and light shielding units 1501 and 1502 on fifth-group lens frame unit 15. Light shielding units 1301 and 1302 on third-group lens frame unit 13 and light shielding units 1501 and 1502 on fifth-group lens frame unit 15 can individually move in the optical axis X direction, and their movement is detected by fixed PIs 201, 200, and 202.

[1-2. Configuration of Imaging Apparatus 1]

FIG. 8 is a control block diagram of whole imaging apparatus 1, and shows the connection relationship between lens barrel 10 and camera body 100.

[1-2-1. Lens Barrel 10]

Lens barrel 10 includes lens control unit 105 (one example of the control unit), a plurality of motors 111M, 112M, 113M, and 114M, and optical system 110.

Lens control unit 105 is formed of a processor such as a central processing unit (CPU), and executes each function of lens barrel 10 in accordance with a predetermined program. Lens control unit 105 can communicate with controller 130 of camera body 100, and transmits data including the position of each lens to controller 130.

The plurality of motors 111M, 112M, 113M, and 114M are controlled by lens control unit 105, and move each lens frame unit of optical system 110 in the optical axis X direction. Specifically, motor 111M is a driving source for moving third-group focus lens 111, motor 112M is a driving source for moving fifth-group focus lens 112. Motor 113M drives diaphragm unit 19, and motor 114M drives the shutter.

Optical system 110 includes third-group focus lens 111, fifth-group focus lens 112, PIs 200, 201, and 202, diaphragm unit 19, and shutter 114, and forms a subject image.

Third-group focus lens 111 is formed of lenses L6 and L7 mounted on third-group lens frame unit 13, and moves in the optical axis X direction with the movement of third-group lens frame unit 13, as discussed above. Fifth-group focus lens 112 is formed of lens L10 mounted on fifth-group lens frame unit 15, and moves in the optical axis X direction with the movement of fifth-group lens frame unit 15, as discussed above.

Optical system 110 may include not only the focus lens groups but also zoom lens groups. In addition, optical system 110 may include an optical image stabilizer (OIS). The lens included in optical system 110 may be formed of several lenses, or may be formed of several groups of lenses.

Each of PIs 200, 201, and 202 has a light emitting unit and a light receiving unit, and outputs a signal corresponding to the shielded state and the received state when shielding units 1301, 1302, 1501, and 1502 pass in between the light emitting unit and the light receiving unit. The output signals are received and processed by lens control unit 105. On the basis of the output signals, lens control unit 105 acquires the position of third-group focus lens 111 moving integrally with light shielding units 1301 and 1302, and the position of fifth-group focus lens 112 moving integrally with light shielding units 1501 and 1502.

Specifically, PI 201 senses the light shielding or light receiving caused by light shielding unit 1301, and lens control unit 105 detects the position of third-group focus lens 111. PI 202 senses the light shielding or light receiving caused by light shielding unit 1501, and lens control unit 105 detects the position of fifth-group focus lens 112. PI 200 senses the light shielding or light receiving caused by light shielding unit 1302 or light shielding unit 1502, and lens control unit 105 detects the positions of third-group focus lens 111 and fifth-group focus lens 112. In other words, PI 201 and PI 202 form a position detection unit for each of third-group and fifth-group focus lenses 111 and 112, and PI 200 forms a shared position detection unit for third-group and fifth-group focus lenses 111 and 112.

[1-2-2. Camera Body 100]

As shown in FIG. 8, camera body 100 includes imaging element 120, an analog front end (AFE), image processing unit 122, liquid crystal monitor 123, buffer memory 124, controller 130, memory card 140, card slot 141, flash memory 142, and operation unit 150.

Imaging element 120 is a complementary-metal-oxide-semiconductor (CMOS) image sensor or a charge-couple-device (CCD) image sensor. Imaging element 120 acquires the subject image formed by optical system 110, and generates image data by photoelectric conversion.

AFE 121 applies various processing to the image data generated by imaging element 120. Specifically, AFE 121 performs processing such as noise suppression by correlated double sampling, amplification of an A/D converter to an input range width by an analog gain controller, and A/D conversion by the A/D converter.

Image processing unit 122 applies various processing to the image data having undergone the former various processing from AFE 121. The latter various processing includes smear correction, white balance correction, gamma correction, YC conversion processing, electronic zoom processing, compression processing, contraction processing, and expansion processing. Image processing unit 122 is formed of a microcomputer for executing a program. In another exemplary embodiment, however, image processing unit 122 may be a hardwired electronic circuit. Image processing unit 122 may be configured integrally with controller 130 or the like.

Controller 130 collectively controls the operation of the whole of imaging apparatus 1. Controller 130 is formed of a read only memory (ROM) and a CPU. Controller 130 transmits a command signal such as a focus or zoom signal to lens control unit 105. Controller 130 also records, as still image data or moving image data, the image data having undergone the various processing from image processing unit 122 into memory card 140 and flash memory 142 (hereinafter referred to as "memory card 140 and the like"). Controller 130 is a microcomputer for executing a program in the present exemplary embodiment. However, instead of this, controller 130 may be a hardwired electronic circuit.

Liquid crystal monitor 123 displays an image such as a through image (live view) or a recorded image. Instead of liquid crystal monitor 123, any display capable of displaying an image, such as an organic light emitting display, may be employed.

Buffer memory 124 is a volatile recording medium serving as a work memory of image processing unit 122 and controller 130.

Flash memory 142 is an internal memory of camera body 100. Flash memory 142 is a nonvolatile recording medium.

Memory card 140 is detachably inserted into card slot 141. Card slot 141 is electrically and mechanically connected to memory card 140.

Memory card 140 is an external memory of camera body 100, for example, a nonvolatile recording medium.

Operation unit 150 is an operation interface for receiving an operation from a user. Operation unit 150 is a general term of an operation button or operation dial disposed on the exterior of camera body 100. Upon receiving the operation from the user, operation unit 150 transmits, to controller 130, a signal corresponding to the content of the operation.

[1-3. Position Management Operation by Imaging Apparatus 1]

Generally, in management of a lens position, the switching position between High and Low as the output of each PI is acquired as an origin position, and the lens position is controlled on the basis of the origin position. In the case of managing the positional relationship between a plurality of lens groups, however, it is difficult to perform an accurate position management when an individual origin is used for each lens group. This is because the origin position is changed by variation in the attachment position of each PI or by the individual difference such as the output change due to the environmental change of each PI.

Then, in the present exemplary embodiment, the reference positions of the plurality of lens groups are managed by the same PI 200 (hereinafter referred to as "shared PI 200"), and the detection direction during PI detection and the lens speed during the detection are made uniform among the lens groups, thereby enabling an accurate position management.

Figure 9:
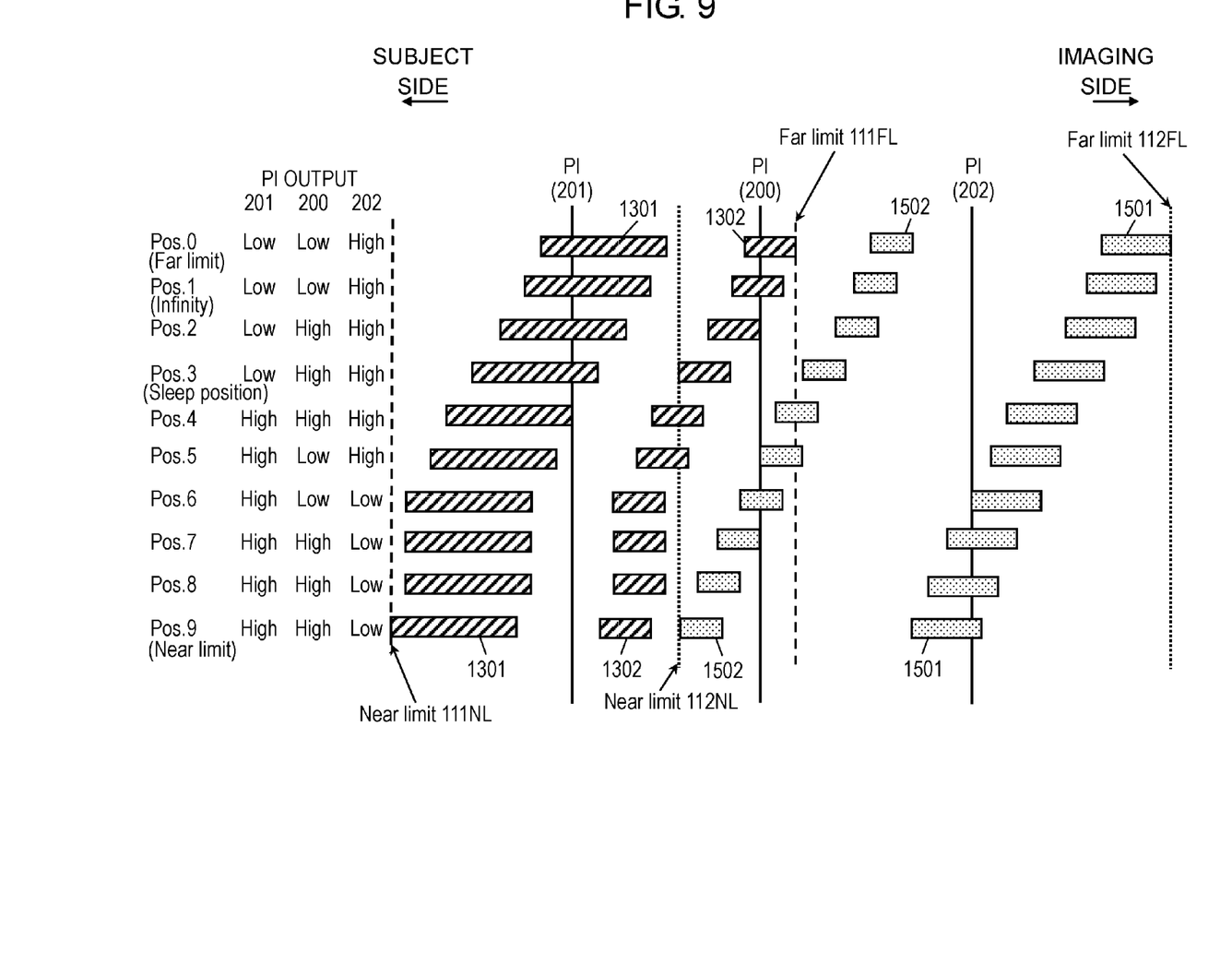
FIG. 9 is a diagram for illustrating a detection position pattern of a lens by the imaging apparatus.

FIG. 9 shows a pattern of the positions of light shielding units 1301, 1302, 1501, and 1502 with respect to PI 201, PI 202, and PI 200 in imaging apparatus 1 of the present exemplary embodiment. PI 201 is a PI (hereinafter referred to as "third-group dedicated PI 201") for detecting the position of third-group focus lens 111. PI 202 is a PI (hereinafter referred to as "fifth-group dedicated PI 202") for detecting the position of fifth-group focus lens 112. PI 200 is a third-group/fifth-group shared PI. As shown in FIG. 9, the positions in six patterns can be uniquely detected except for the limit positions (Far Limit and Near Limit).

In the present exemplary embodiment, the output of each of PI 200, PI 201, and PI 202 when it is receiving light is set to be High, and the output thereof when it is being shielded is set to be Low. The output of High may be reverse to output of Low.

[1-3-1. Reference Position Detection Operation]
<When Each Lens Group is at a Normal Storage Position>

Figure 10:
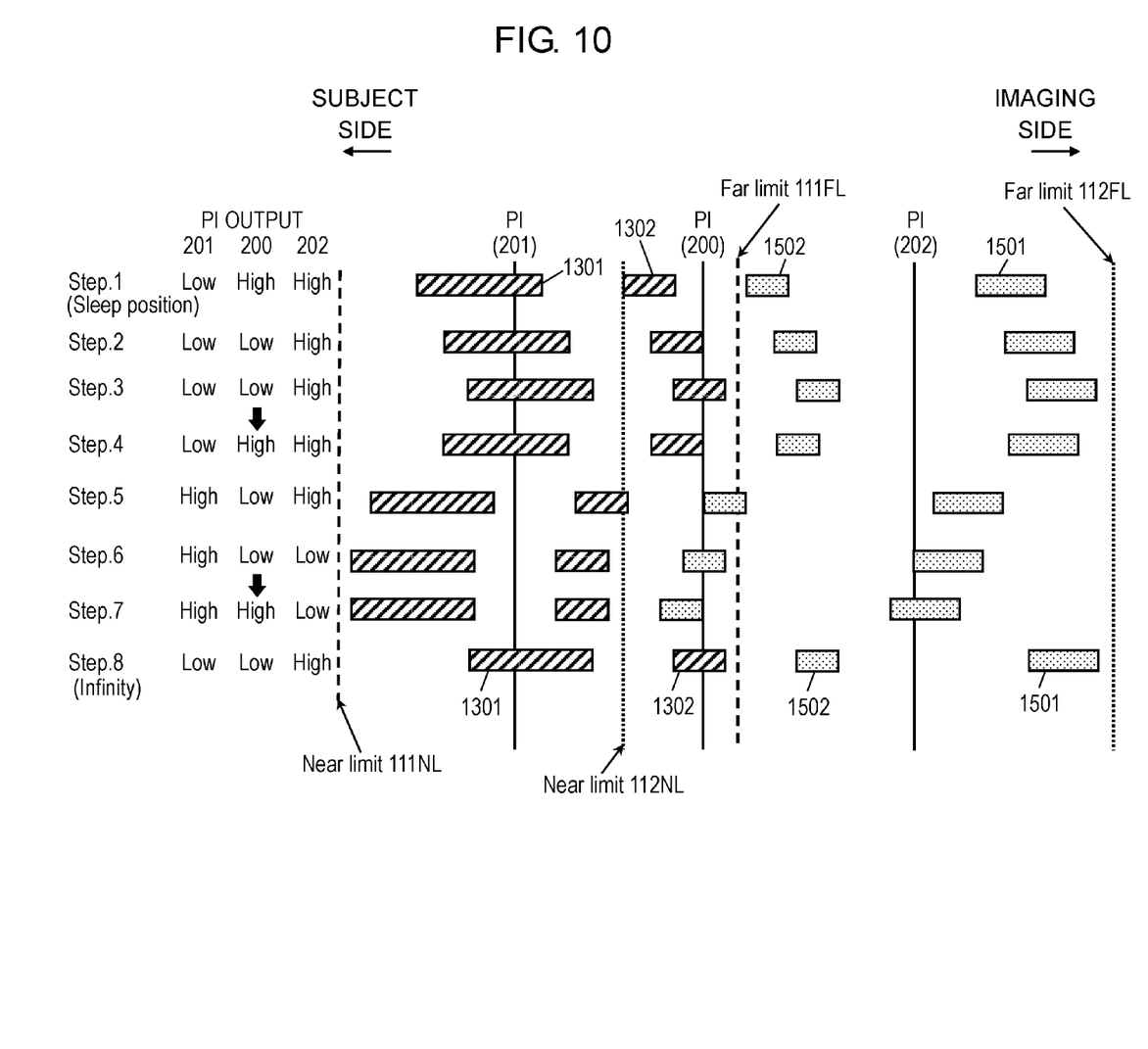
FIG. 10 is a diagram for illustrating the initializing processing of a lens position by the imaging apparatus.

FIG. 10 shows the detection operation of reference positions (examples of the initialization positions) of third-group focus lens 111 and fifth-group focus lens 112 located at normal storage positions (Sleep positions).

Step 1: Lens control unit 105 detects the positions of third-group focus lens 111 and fifth-group focus lens 112 that are in the normal storage state. This position detection is performed using third-group dedicated PI 201, fifth-group dedicated PI 202, and shared PI 200 as discussed above. In other words, third-group dedicated PI 201 senses the light receiving or light shielding caused by light shielding unit 1301 of third-group lens frame unit 13. Fifth-group dedicated PI 202 senses the light receiving or light shielding caused by light shielding unit 1501 of fifth-group lens frame unit 15. Shared PI 200 senses the light receiving or light shielding caused by light shielding unit 1302 of third-group lens frame unit 13 or light shielding unit 1501 of fifth-group lens frame unit 15. The position detection is performed on the basis of the sensing result when third-group dedicated PI 201, fifth-group dedicated PI 202, and shared PI 200 have sensed such light receiving or light shielding.

Step 2: Lens control unit 105 moves third-group focus lens 111 and fifth-group focus lens 112 in the Far direction at the same speed. At this time, lens control unit 105 operates lens frame units 13 and 15 in the same direction at the same speed so that third-group focus lens 111 does not interfere with fifth-group focus lens 112. Here, each lens moves within the range between its Near Limit and Far Limit, and stops when it reaches a limit position. Lens control unit 105 detects that the output of shared PI 200 is switched from High to Low. Light shielding unit 1302 shields shared PI 200, and hence the switch of the output is detected.

Step 3: After the output of shared PI 200 is switched from High to Low in Step 2, the output of shared PI 200 is made stable at Low in preparation for detecting that the output of shared PI 200 is switched from Low to High in next Step 4.

Step 4: Lens control unit 105 drives third-group focus lens 111 and fifth-group focus lens 112 in the Near direction at the same speed, and detects that the output of shared PI 200 is switched from Low to High. Thus, the position of third-group focus lens 111 is initialized. Here, when light shielding unit 1302 releases the shielding of shared PI 200, the switch of the output is detected.

Step 5: Lens control unit 105 moves third-group focus lens 111 and fifth-group focus lens 112 in the Near direction at the same speed. Lens control unit 105 detects that the output of shared PI 200 is switched from High to Low. Here, light shielding unit 1502 shields shared PI 200, and hence the switch of the output is detected.

Step 6: After the output of shared PI 200 is switched from High to Low in Step 5, the output of shared PI 200 is made stable at Low in preparation for detecting that the output of shared PI 200 is switched from Low to High in next Step 7.

Step 7: Lens control unit 105 drives third-group focus lens 111 and fifth-group focus lens 112 in the Near direction at the same speed, and detects that the output of shared PI 200 is switched from Low to High. Thus, the position of fifth-group focus lens 112 is initialized. Here, light shielding unit 1502 releases the shielding of shared PI 200, and hence the switch of the output is detected.

Step 8: Lens control unit 105 moves third-group focus lens 111 and fifth-group focus lens 112 to infinite positions.

As discussed above, the detected initialization position is stored in a predetermined memory. On the basis of the initialization position, the lens is moved in accordance with a command for focus or zoom issued from camera body 100.

<When Each Lens Group is in an Inconstant State>

The above-mentioned initializing processing is effective when third-group focus lens 111 and fifth-group focus lens 112 are located at normal storage positions (Sleep positions). When shared PI 200 is used by a plurality of lens groups and each lens position is inconstant, however, the region in which each lens position is located cannot be uniquely identified, and interference between lenses occurs. The time when the lens position is inconstant means an initial startup time of imaging apparatus 1, or a battery insertion or extraction time during a photographing operation, for example.

In the present exemplary embodiment, in addition to shared PI 200, PIs 201 and 202 (hereinafter referred to as "third-group dedicated PI 201" and "fifth-group dedicated PI 202") for detecting the position of each lens group are disposed. By combining the outputs of shared PI 200 and dedicated PIs 201 and 202, a region in which each lens group is located can be identified. Thus, even when each lens position is inconstant, each lens position can be safely initialized without causing interference between lens groups.

Figure 11:
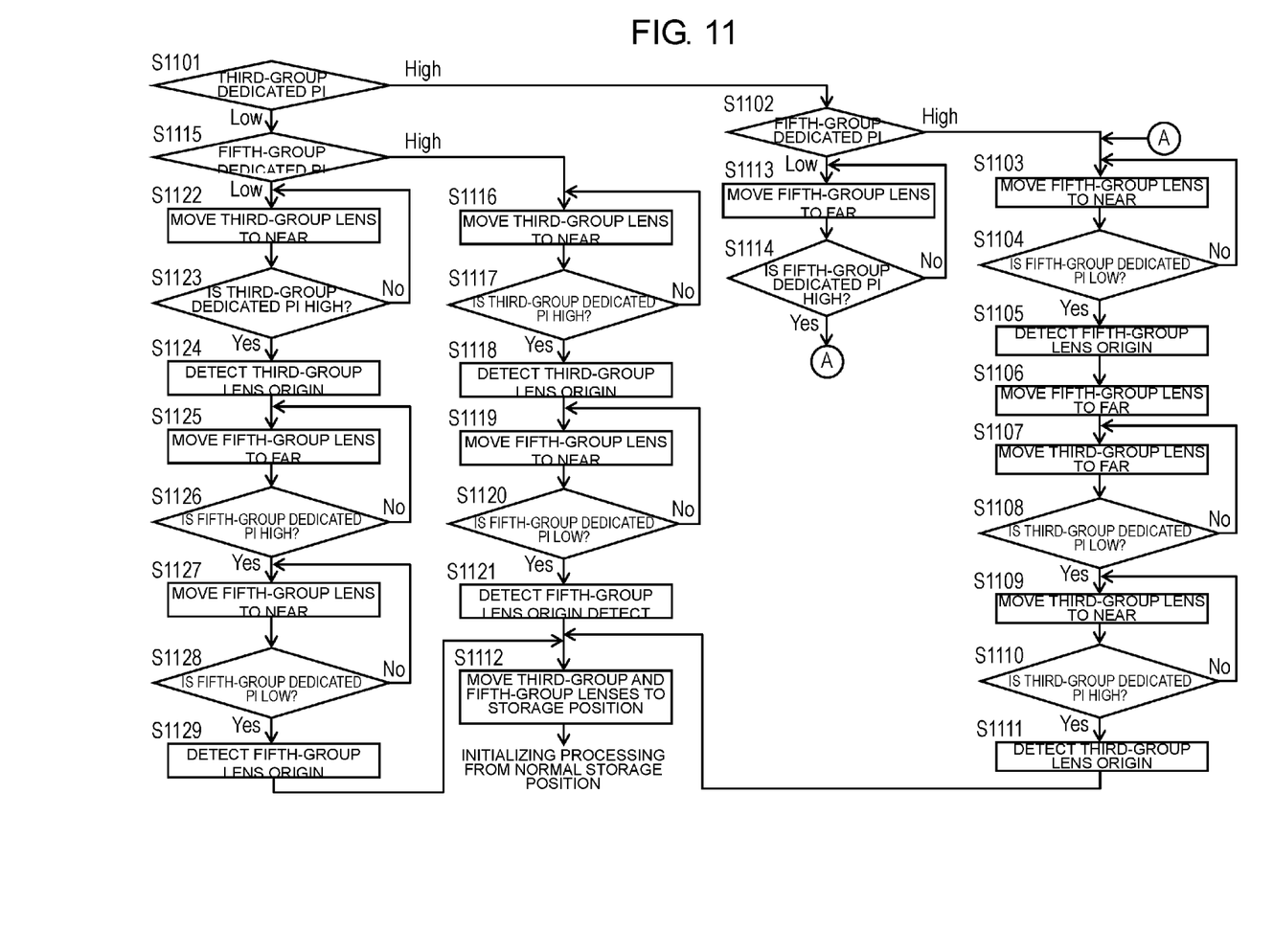
FIG. 11 is a flowchart showing the initializing preprocessing of the lens position when the lens is located at an inconstant position.

Hereinafter, the processing (one example of the initializing preprocessing) when the positions of third-group focus lens 111 and fifth-group focus lens 112 are inconstant is described using FIG. 11.

The number of switching points of third-group dedicated PI 201 is only one between the Near limit and Far limit of third-group focus lens 111. The number of switching points of fifth-group dedicated PI 202 is only one between the Near limit and Far limit of fifth-group focus lens 112. Therefore, when third-group dedicated PI 201 is at High (namely, Near side), fifth-group dedicated PI 202 can be detected. While, when the output of fifth-group dedicated PI 202 is High (namely, Far side), third-group dedicated PI 201 can be detected. In order to enable such detection, a mechanical structure is designed intentionally. On the basis of the design, lens control unit 105 executes the following processing.

S1101: Lens control unit 105 detects an output of third-group dedicated PI 201. When the output is High, the processing goes to S1102. When the output is Low, the processing goes to S1115.

S1102: Lens control unit 105 detects an output of fifth-group dedicated PI 202. When the output is High, the processing goes to S1103. When the output is Low, the processing goes to S1113.

S1103: Lens control unit 105 moves fifth-group focus lens 112 to the Near side.

S1104: Lens control unit 105 detects whether, as the result of the movement in S1103, light shielding unit 1501 shields fifth-group dedicated PI 202 and hence the output of fifth-group dedicated PI 202 becomes Low. When the output is not Low, the processing returns to S1103. When the output is Low, the processing goes to S1105.

S1105: Lens control unit 105 detects, as a temporary initialization position of fifth-group focus lens 112, the position at which the output of fifth-group dedicated PI 202 changes from High to Low, and stores the position in a predetermined memory.

S1106: Lens control unit 105 moves fifth-group focus lens 112 to the Far side. This is performed for the purpose of preventing the interference between lenses when the third-group focus lens is moved for its position detection.

S1107: Lens control unit 105 moves third-group focus lens 111 to the Far side.

S1108: Lens control unit 105 detects whether, as the result of the movement in S1107, light shielding unit 1301 shields third-group dedicated PI 201 and hence the output of third-group dedicated PI 201 becomes Low. When the output is not Low, the processing returns to S1107. When the output is Low, the processing goes to S1109.

S1109: Lens control unit 105 moves third-group focus lens 111 to the Near side.

S1110: Lens control unit 105 detects whether, as the result of the movement in S1109, light shielding unit 1301 releases the shielding of third-group dedicated PI 201 and hence the output of third-group dedicated PI 201 becomes High. When the output is not High, the processing returns to S1109. When the output is High, the processing goes to S1111.

S1111: Lens control unit 105 detects, as a temporary initialization position of third-group focus lens 111, the position at which the output of third-group dedicated PI 201 changes from Low to High, and stores the position in the predetermined memory.

S1112: Lens control unit 105 moves third-group focus lens 111 and the fifth-group focus lens to the normal storage positions on the basis of the temporary initialization positions. Then, lens control unit 105 executes the initializing processing of FIG. 10.

S1113: When the output of fifth-group dedicated PI 202 is Low in S1102, lens control unit 105 moves fifth-group focus lens 112 to the Far side.

S1114: Lens control unit 105 detects whether, as the result of the movement in S1113, light shielding unit 1501 releases the shielding of fifth-group dedicated PI 202 and hence the output of fifth-group dedicated PI 202 becomes High. When the output is not High, the processing returns to S1113. When the output is High, lens control unit 105 performs the processing from 1103 to S1112.

S1115: When the output of third-group dedicated PI 201 is Low in S1101, lens control unit 105 detects an output of fifth-group dedicated PI 202. When the output is High, the processing goes to S1116. When the output is Low, the processing goes to S1122.

S1116: Lens control unit 105 moves third-group focus lens 111 to the Near side.

S1117: Lens control unit 105 detects whether, as the result of the movement in S1116, light shielding unit 1301 releases the shielding of third-group dedicated PI 201 and hence the output of third-group dedicated PI 201 becomes High. When the output is not High, the processing returns to S1116. When the output is High, the processing goes to S1118.

S1118: Lens control unit 105 detects, as a temporary initialization position of third-group focus lens 111, the position at which the output of third-group dedicated PI 201 changes from Low to High, and stores the position in the predetermined memory.

S1119: Lens control unit 105 moves fifth-group focus lens 112 to the Near side.

S1120: Lens control unit 105 detects whether, as the result of the movement in S1119, light shielding unit 1501 shields fifth-group dedicated PI 202 and hence the output of fifth-group dedicated PI 202 becomes Low. When the output is not Low, the processing returns to S1119. When the output is Low, the processing goes to S1121.

S1121: Lens control unit 105 detects, as a temporary initialization position of fifth-group focus lens 112, the position at which the output of fifth-group dedicated PI 202 changes from High to Low, and stores the position in a predetermined memory. Then, in S1112, lens control unit 105 moves third-group focus lens 111 and the fifth-group focus lens to the normal storage positions on the basis of the temporary initialization positions, and then executes the initializing processing of FIG. 10.

S1122: When the output of fifth-group dedicated PI 202 is Low in S1115, lens control unit 105 moves third-group focus lens 111 to the Near side.

S1123: Lens control unit 105 detects whether, as the result of the movement in S1122, light shielding unit 1301 releases the shielding of third-group dedicated PI 201 and hence the output of third-group dedicated PI 201 becomes High. When the output is not High, the processing returns to S1122. When the output is High, the processing goes to S1124.

S1124: Lens control unit 105 detects, as a temporary initialization position of third-group focus lens 111, the position at which the output of third-group dedicated PI 201 changes from Low to High, and stores the position in the predetermined memory.

S1125: Lens control unit 105 moves fifth-group focus lens 112 to the Far side.

S1126: Lens control unit 105 detects whether, as the result of the movement in S1125, light shielding unit 1501 releases the shielding of fifth-group dedicated PI 202 and hence the output of fifth-group dedicated PI 202 becomes High. When the output is not High, the processing returns to S1125. When the output is High, the processing goes to S1127.

S1127: Lens control unit 105 moves fifth-group focus lens 112 to the Near side.

S1128: Lens control unit 105 detects whether, as the result of the movement in S1127, light shielding unit 1501 shields fifth-group dedicated PI 202 and hence the output of fifth-group dedicated PI 202 becomes Low. When the output is not Low, the processing returns to S1127. When the output is Low, the processing goes to S1129.

S1129: Lens control unit 105 detects, as a temporary initialization position of fifth-group focus lens 112, the position at which the output of fifth-group dedicated PI 202 changes from High to Low, and stores the position in the predetermined memory. Then, in S1112, lens control unit 105 moves third-group focus lens 111 and the fifth-group focus lens to the normal storage positions on the basis of the temporary initialization positions, and then executes the initializing processing of FIG. 10.

[1-4. Feature or the Like]

Imaging apparatus 1 of the present exemplary embodiment is an imaging apparatus that moves a lens in the optical axis direction with respect to an initialization position and images a subject. Imaging apparatus 1 includes: third-group focus lens 111 (one example of the first lens); a fifth-group focus lens (one example of the second lens); motors 111M and 112M (examples of the driving unit); third-group dedicated PI 201 (one example of the first position detection sensor); fifth-group dedicated PI 202 (one example of the second position detection sensor); shared PI 200 (one example of the third position detection sensor); and lens control unit 105 (one example of the control unit). Motors 111M and 112M (examples of the driving unit) move third-group focus lens 111 and fifth-group focus lens 112 in the optical axis direction. Third-group dedicated PI 201 (one example of the first position detection sensor) detects only the position of third-group focus lens 111. In other words, third-group dedicated PI 201 (one example of the first position detection sensor) detects the position of third-group focus lens 111, and does not detect the position of fifth-group focus lens 112. Fifth-group dedicated PI 202 (one example of the second position detection sensor) detects only the position of fifth-group focus lens 112. In other words, fifth-group dedicated PI 202 (one example of the second position detection sensor) detects the position of fifth-group focus lens 112, and does not detect the position of third-group focus lens 111. Shared PI 200 (one example of the third position detection sensor) detects the position of third-group focus lens 111 and the position of fifth-group focus lens 112. Lens control unit 105 (one example of the control unit) controls motors 111M and 112M, and processes the outputs from PIs 201, 202, and 200. On the basis of the output from shared PI 200, lens control unit 105 executes the initializing processing of determining the position of third-group focus lens 111 and the initialization position of fifth-group focus lens 112.

In imaging apparatus 1 of the present exemplary embodiment, the reference positions of third-group focus lens 111 and fifth-group focus lens 112 are determined on the basis of the output from one shared PI 200. Therefore, the positions of third-group focus lens 111 and fifth-group focus lens 112 between which relative positional accuracy is high can be initialized. As a result, the individual difference between the PIs and the environmental difference (attitude, temperature characteristic, and difference between lens groups in the blunting rate of the output waveform of a PI which depends on the lens speed) can be eliminated, and an accurate position management can be achieved.

In imaging apparatus 1, lens control unit 105 moves third-group focus lens 111 and fifth-group focus lens 112 in the same direction at the same speed in the initializing processing. Therefore, a more accurate position management can be achieved.

In imaging apparatus 1, furthermore, lens control unit 105 determines the outputs from third-group dedicated PI 201 and fifth-group dedicated PI 202 before executing the initializing processing. Lens control unit 105 executes the initializing preprocessing of moving third-group focus lens 111 and fifth-group focus lens 112 to the normal storage positions (examples of a predetermined position) in the sequence corresponding to the determination. Even in the state where the positions of lens groups are inconstant, initializing processing in which the relative positional accuracy between lenses is high can be executed without causing interference between the lens groups. Thus, accurate position management using a plurality of lens groups can be reconciled with the initialization of a safe lens position when lens position is inconstant.

Another Exemplary Embodiment

Thus, an exemplary embodiment of the present exposure has been described. However, the present exposure is not limited to the exemplary embodiment. The exposure can be variously modified in the range that does not depart from the scope of the exposure.

(A) The position management operation by the exemplary embodiment can be achieved only by lens barrel 10 of imaging apparatus 1.

(B) In the exemplary embodiment, lens barrel 10 can be attached to or detached from camera body 100. However, the present disclosure is not limited to this. Lens barrel 10 may be a non-exchangeable lens barrel fixed to camera body 100.

(C) In the exemplary embodiment, lens control unit 105 executes the initializing processing and initializing preprocessing of the lens positions. However, these processings may be executed via lens control unit 1055 by controller 103 of camera body 100.

(D) The exemplary embodiment has described, as an example, the structure of a lens barrel that includes first-group lens frame unit 11 to fifth-group lens frame unit 15 having five lens groups arranged along the optical axis direction, and includes lens frame 16 having lens L4. However, the present disclosure is not limited to this.

(E) The exemplary embodiment has described the position management of third-group focus lens 111 and fifth-group focus lens 112. This position management can be also applied to another lens group (for example, zoom lens). A similar position management can be applied to any structure as long as the structure employs three PIs (two dedicated PIs and one shared PI) for two lens groups. Relative position management between three or more lenses can be performed using one shared PI and three or more dedicated PIs.

The application is based on Japanese Patent Application (No. 2015-046511) filed on Mar. 9, 2015, the contents of which are incorporated herein by reference.

INDUSTRIAL APPLICABILITY

An imaging apparatus of the present disclosure can perform accurate position management using a plurality of lenses, and can be widely applied to an imaging apparatus such as a digital camera.

What is claimed is:
1. An imaging apparatus for moving a lens in an optical axis direction with respect to an initialization position and imaging a subject, the imaging apparatus comprising:
   a first lens;
   a second lens;
   a driving unit for moving the first lens and the second lens in the optical axis direction;
   a first position detection sensor for detecting a position of the first lens;
   a second position detection sensor for detecting a position of the second lens;
   a third position detection sensor for detecting the position of the first lens and the position of the second lens; and
   a control unit for controlling the driving unit and processing outputs from the first position detection sensor, the second position detection sensor, and the third position detection sensor,
   wherein, based on the output from the third position detection sensor, the control unit executes initializing processing of determining initialization positions of the first lens and the second lens,
   wherein the output from each of the first position detection sensor, the second position detection sensor, and the third position detection sensor can be changed by light receiving and light shielding, and wherein the imaging apparatus further comprises:
- a first light shielding unit moving together with the first lens and capable of shielding the first position detection sensor;
- a second light shielding unit moving together with the first lens and capable of shielding the third position detection sensor;
- a third light shielding unit moving together with the second lens and capable of shielding the second position detection sensor; and
- a fourth light shielding unit moving together with the second lens and capable of shielding the third position detection sensor.

2. The imaging apparatus according to claim 1, wherein in the initializing processing, the control unit makes the driving unit move the first lens and the second lens at the same speed.

3. The imaging apparatus according to claim 1, wherein in the initializing processing, the control unit makes the driving unit move the first lens and the second lens in the same direction.

4. The imaging apparatus according to claim 1, wherein when the first lens and the second lens are located at predetermined positions, the control unit executes the initializing processing.

5. The imaging apparatus according to claim 4, wherein before executing the initializing processing, the control unit determines the outputs from the first position detection sensor and the second position detection sensor, and executes initializing preprocessing of making the driving unit move the first lens and the second lens to the predetermined positions in a sequence corresponding to the determination.

6. The imaging apparatus according to claim 5, wherein the control unit executes the initializing preprocessing at an initial startup time of the imaging apparatus or at a battery insertion or extraction time during a photographing operation.

7. A lens barrel for moving a lens in an optical axis direction with respect to an initialization position and acquiring an optical image of a subject, the lens barrel comprising:
- a first lens;
- a second lens;
- a driving unit for moving the first lens and the second lens in the optical axis direction;
- a first position detection sensor for detecting a position of the first lens;
- a second position detection sensor for detecting a position of the second lens;
- a third position detection sensor for detecting the position of the first lens and the position of the second lens; and
- a control unit for controlling the driving unit and processing outputs from the first position detection sensor, the second position detection sensor, and the third position detection sensor, wherein, based on the output from the third position detection sensor, the control unit determines initialization positions of the first lens and the second lens, wherein the output from each of the first position detection sensor, the second position detection sensor, and the third position detection sensor can be changed by light receiving and light shielding, and wherein the lens barrel further comprises:
- a first light shielding unit moving together with the first lens and capable of shielding the first position detection sensor;
- a second light shielding unit moving together with the first lens and capable of shielding the third position detection sensor;
- a third light shielding unit moving together with the second lens and capable of shielding the second position detection sensor; and
- a fourth light shielding unit moving together with the second lens and capable of shielding the third position detection sensor.

8. The imaging apparatus according to claim 3, wherein
(i) the position of the first lens is initialized when the control unit detects that the output from the third position detection sensor is switched from Low to High by the second light shielding unit, and the position of the second lens is initialized when the control unit detects that the output from the third position detection sensor is switched from Low to High by the fourth light shielding unit, or
(ii) the position of the first lens is initialized when the control unit detects that the output from the third position detection sensor is switched from High to Low by the second light shielding unit, and the position of the second lens is initialized when the control unit detects that the output from the third position detection sensor is switched from High to Low by the fourth light shielding unit.

* * * * *